US008886690B2

(12) United States Patent
Carver et al.

(10) Patent No.: US 8,886,690 B2
(45) Date of Patent: Nov. 11, 2014

(54) DISTRIBUTED DATA STORAGE AND ACCESS SYSTEMS

(75) Inventors: David C. Carver, Lexington, MA (US); Branko J. Gerovac, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 134 days.

(21) Appl. No.: 13/308,234

(22) Filed: Nov. 30, 2011

(65) Prior Publication Data

US 2012/0072459 A1 Mar. 22, 2012

Related U.S. Application Data

(63) Continuation of application No. 12/170,657, filed on Jul. 10, 2008, now Pat. No. 8,099,402.

(51) Int. Cl.
*G06F 17/30* (2006.01)
*H04L 29/08* (2006.01)

(52) U.S. Cl.
CPC ............ *H04L 67/06* (2013.01); *H04L 67/1008* (2013.01); *H04L 67/1002* (2013.01); *H04L 67/1095* (2013.01)
USPC .......................................... 707/812; 707/694

(58) Field of Classification Search
USPC .................. 707/705, 706, 812, 694
See application file for complete search history.

(56) References Cited

U.S. PATENT DOCUMENTS

| | | |
|---|---|---|
| 3,746,780 A | 7/1973 | Stetten et al. |
| 3,851,104 A | 11/1974 | Willard et al. |
| 4,845,658 A | 7/1989 | Gifford |
| 5,132,992 A | 7/1992 | Yurt et al. |
| 5,581,552 A | 12/1996 | Civanlar et al. |
| 5,581,784 A | 12/1996 | Tobagi et al. |
| 5,583,995 A | 12/1996 | Gardner et al. |
| 5,608,448 A | 3/1997 | Smoral et al. |
| 5,640,563 A | 6/1997 | Carmon |

(Continued)

FOREIGN PATENT DOCUMENTS

| | | |
|---|---|---|
| EP | 0 701 370 A1 | 3/1996 |
| GB | 2 398 479 A | 12/2003 |

(Continued)

OTHER PUBLICATIONS

Dan et al., "A Dynamic Policy of Segment Replication for Load-Balancing in Video-On-Demand Servers," Multimedia Systems, vol. 3, No. 3, Jul. 1995, pp. 93-103, XP000865922.

(Continued)

*Primary Examiner* — Alexey Shmatov
(74) *Attorney, Agent, or Firm* — Harrity & Harrity, LLP (57) ABSTRACT

A distributed system for content storage and access includes a storage platform having at least a first storage component, and an access platform having one or multiple access components. Each access component is associated with at least one access service. The access service may be an administrative service for receiving a service request initiated by a first user, the service request being associated with a first item of content, and for identifying a characteristic of the service request, a content management service for determining, based at least in part on the characteristic of the service request, a specification of a data transfer operation to be executed in association with the first storage component, and a directory service for maintaining information associated with the first item of content.

20 Claims, 6 Drawing Sheets

(56) References Cited

U.S. PATENT DOCUMENTS

| | | | |
|---|---|---|---|
| 5,787,482 | A | 7/1998 | Chen et al. |
| 5,805,804 | A | 9/1998 | Laursen et al. |
| 5,862,312 | A | 1/1999 | Mann et al. |
| 5,926,649 | A | 7/1999 | Ma et al. |
| 6,230,200 | B1 | 5/2001 | Forecast et al. |
| 6,374,336 | B1 | 4/2002 | Peters et al. |
| 6,401,126 | B1 | 6/2002 | Douceur et al. |
| 6,609,149 | B1 | 8/2003 | Bandera et al. |
| 7,058,947 | B1 | 6/2006 | Raja et al. |
| 7,277,978 | B2 | 10/2007 | Khatami et al. |
| 2002/0162047 | A1* | 10/2002 | Peters et al. ............... 714/5 |
| 2003/0005457 | A1 | 1/2003 | Faibish et al. |
| 2003/0140051 | A1 | 7/2003 | Fujiwara et al. |
| 2003/0195948 | A1 | 10/2003 | Takao et al. |
| 2004/0103437 | A1 | 5/2004 | Allegrezza et al. |
| 2004/0198386 | A1 | 10/2004 | Dupray |
| 2005/0181803 | A1 | 8/2005 | Weaver et al. |
| 2005/0262246 | A1* | 11/2005 | Menon et al. ............. 709/226 |
| 2006/0062555 | A1 | 3/2006 | Zimmermann et al. |
| 2006/0087990 | A1 | 4/2006 | Kakivaya et al. |
| 2006/0190552 | A1 | 8/2006 | Henze et al. |
| 2006/0259662 | A1 | 11/2006 | Furukawa et al. |
| 2006/0272015 | A1 | 11/2006 | Frank et al. |
| 2007/0244939 | A1* | 10/2007 | Devarakonda et al. ....... 707/205 |
| 2008/0109580 | A1 | 5/2008 | Carlson et al. |
| 2008/0244033 | A1 | 10/2008 | Hook et al. |
| 2008/0273540 | A1 | 11/2008 | Gerovac et al. |
| 2010/0010999 | A1 | 1/2010 | Gerovac et al. |
| 2010/0011002 | A1 | 1/2010 | Gerovac et al. |
| 2010/0011003 | A1 | 1/2010 | Carver et al. |
| 2010/0011091 | A1 | 1/2010 | Carver et al. |
| 2010/0011096 | A1 | 1/2010 | Gerovac et al. |
| 2010/0011145 | A1 | 1/2010 | Carver et al. |
| 2010/0011364 | A1 | 1/2010 | Gerovac et al. |
| 2010/0011365 | A1 | 1/2010 | Gerovac et al. |

FOREIGN PATENT DOCUMENTS

| | | |
|---|---|---|
| WO | WO 2008/137334 | 11/2008 |
| WO | WO 2010/006127 | 1/2010 |
| WO | WO 2010/006132 | 1/2010 |
| WO | WO 2010/006134 | 1/2010 |

OTHER PUBLICATIONS

Kit Sang Tang et al., "Optimal File Placement in VOD System Using Genetic Algorithm," IEEE Transactions on Industrial Electronics, vol. 48, No. 5, Oct. 2001, pp. 891-897.

Notification of Transmittal of the International Search Report and the Written Opinion of the International Searching Authority, or the Declaration corresponding to PCT/US2009/050059, mailed Mar. 29, 2011, 22 pages.

Restriction Requirement dated Jul. 9, 2010 from U.S. Appl. No. 12/170,787.

PCT Written Opinion of the ISA for PCT/US2008/061401 dated Jul. 1, 2008.

Office Action dated May 7, 2010 for U.S. Appl. No. 12/170,769.

Restriction Requirement dated Jun. 10, 2010 from U.S. Appl. No. 12/170,624.

PCT Search Report of the ISA for PCT/US2009/050057 dated Jan. 14, 2010.

Written Opinion of the ISA for PCT/US2009/050057 dated Jan. 14, 2010.

PCT International Preliminary Report of Patentability, date mailed Nov. 19, 2009, for PCT/US2008/061401.

PCT Invitation to Pay Additional Fees dated Oct. 26, 2009 for PCT Pat. No. PCT/US2009/050057 filed on Jul. 9, 2009.

Gal: "Algorithms and Data Structures for Flash Memories;" ACM Computing Surveys, vol. 37, No. 2; DOI=http://doi.acm.org/10.1145/1089733.1089735; Jun. 2005; pp. 138-163.

Liu et al.; "Scheduling Algorithms for Multiprogramming in a Hard-Read-Time Environment" Journal of the Association for Computing Machinery, vol. 20, No. 1; DOI=http://doi.acm.org/10.1145/321738.321743; Jan. 1973; pp. 46-61.

Mourad; "Issues in the design of a storage server for video-on-demand;" Multimedia Systems; vol. 4, No. 2; Apr. 1, 1996; XP008040912; pp. 70-86.

"NAND Flash Memories and Programming NAND Flash Memories Using ELNEC Device Programmers Application Note Version 2.01; " Sep. 2006, pp. 1-31.

Samsung Memory Division; NAND Flash ECC Algorithm 256B; Jun. 24, 2004; 8 sheets.

Samsung Memory Division; ECC Algorithm; 512B; Apr. 28, 2005; 8 sheets.

Samsung Memory Division; NAND Flash Spare Area Assignment Standard; Apr. 27, 2005; 5 sheets.

Venugopal et al.; "A Taxonomy of Data Grids for Distributed Data Sharing, Management, and Processing;" AMC Computing Surveys, vol. 38, Mar. 2006; Article 3, pp. 1-53.

PCT Search Report of the ISA for PCT/US2008/061401 dated Jul. 1, 2008.

PCT Search Report and Written Opinion of the ISA for PCT/US2009/050051 dated Sep. 7, 2009.

Sha et al.; "A Systematic Approach to Designing Distributed Real-Time Systems;" Computer vol. 26, No. 9; DOI=http://dx.doi.org//10.1109/2.231276; Sep. 1993; pp. 67-78.

Ruemmler et al., "An introduction to disk drive modeling." IEEE Computer Magazine, 27(3), pp. 17-29, Mar. 1994.

Talagal et al., "Microbenchmark-based extraction of local and global disk characteristics", Technical Report. Department of Computer Science, University of California at Berkeley, CSD-99-1063, 1999.

Schindler et al., "Automated disk drive characterization", Technical Report CMU-CS-99-176, Carnegie Mellon University, Nov. 1999.

Worthington et al., "On-Line Extraction of SCSI Disk Drive Parameters" SIGMETRICS 95, pp. 146-156.1995.

Teorey et al., "A Comparative Analysis of Disk Scheduling Policies", Communications of the ACM, v.15 n. 3, pp. 177-184, Mar. 1972.

Oney, "Queueing Analysis of the Scan Policy for Moving-Head Disks", Journal of the Association for Computing Machinery, vol. 22, No. 3, Jul. 1975, pp. 397-412.

Worthington et al., "Scheduling for Modern Disk Drives and Non-Random Workloads", University of Michigan, Technical Report CSE-TR-194-94, Mar. 1, 1994.

Reddy et al., Issues in a multimedia system, IEEE Computer Magazine 27, 3, pp. 69-74, Mar. 1994.

Zimmermann, "Continuous Media Placement and Scheduling in Heterogeneous Disk Storage Systems", Technical Report USC-99-699, 1999.

Shenoy et al., "Cello: A Disk Scheduling Framework for Next Generation Operating Systems", Real-Time Syst. 22, 1-2, 9-48, Jan. 2002.

Goel et al., "SCADDAR: An Efficient Randomized Technique to Reorganize Continuous Media Blocks", 18th International Conference on Data Engineering (ICDE 2002), San Jose, California, Feb. 26-Mar. 1, 2002.

Shahabi et al., "Yima: A Second-Generation Continuous Media Server", IEEE Computer Magazine, pp. 56-64, Jun. 2002.

Schroeder et al., "Disk failures in the real world: What does an MTTF of 1,000,000 hours mean to you?", Proceedings of the 5th USENIX Conference on File and Storage Technologies (FAST '07), pp. 1-16, 2007.

Pinheiro et al., "Failure Trends in a Large Disk Drive Population", Proceedings of the 5th USENIX Conference on File and Storage Technologies (FAST '07), pp. 17-28, 2007.

Androutsellis-Theotokis et al., "A Survey of Peer-to-Peer Content Distribution Technologies", ACM Computing Surveys, vol. 36, No. 4, pp. 335-371, Dec. 2004.

Venugopal et al., "A Taxonomy of Data Grids for Distributed Data Sharing, Management, and Processing", ACM Computing Surveys, vol. 38, No. 3, pp. 1-53, Mar. 2006.

Amazon, "Amazon S3 Developer Guide (API Version Mar. 1, 2006)", Internet, 2007.

Liskov et al., "Providing Persistent Objects in Distributed Systems", Proceedings of the 13th European Conference on Object-Oriented Programming, Jun. 14-18, 1999.

(56) References Cited

OTHER PUBLICATIONS

Liskov et al., "Transactional File Systems Can Be Fast", Proceedings of the 11th Workshop on ACM SIGOPS European Workshop: Beyond the PC, Sep. 19-22, 2004.

Braam, "File Systems for Clusters from a Protocol Perspective", Second Extreme Linux Topics Workshop, Monterey, Jun. 1999.

Hartman et al., "The Zebra Striped Network File System", ACM Transactions on Computer Systems, vol. 13, No. 3, pp. 274-310, Aug. 1995.

Long et al., "Swift/RAID: A Distributed RAID System", Computer Systems, vol. 7, No. 3, pp. 333-359, Jun. 1994.

Patterson et al., "A Case for Redundant Arrays of Inexpensive Disks (RAID)" Proceedings of the 1988 ACM SIGMOD International Conference on Management of Data, ACM Press, Jun. 1988.

Chen et al., RAID; High-Performance, Reliable Secondary Storage, ACM Computer Survey vol. 26, No. 2, pp. 145-185, Jun. 1994.

Stonebraker et al., "Distributed RAID—A New Multiple Copy Algorithm", Proceedings of the Sixth International Conference on Data Engineering, IEEE Computer Society, pp. 430-437, Feb. 1990.

Thouin et al., "Video-on-Demand Networks: Design Approaches and Future Challenges", IEEE Network, Special Issue, vol. 21, No. 2, pp. 42-48, Mar. 2007.

Stoller et al., "Storage Replication and Layout in Video-on-Demand Servers", Proceedings of the 5th International Workshop on Network and Operating System Support for Digital Audio and Video, Apr. 19-21, 1995.

Tetzlaff et al., "Elements of scalable video servers", Proceedings of the 40th IEEE Computer Society International Conference, pp. 239-248, Mar. 1995.

Wong et al., "Strategic Selection and Replication of Movies by Trend-Calibrated Movie-Demand Model", Proceedings of the 2000 international Conference on Microelectronic Systems Education, IEEE Computer Society, pp. 97-100, Nov. 2000.

Little et al., "Popularity-Based Assignment of Movies to Storage Devices in a Video-on-Demand System", Multimedia Systems, vol. 2, No. 6, pp. 280-287, Jan. 1995.

Griwodz et al., "Long-term Movie Popularity Models in Video-on-Demand Systems", Proceedings of the 5th ACM International Conference on Multimedia, pp. 349-357, Nov. 1997.

Ghandeharizadeh et al., "Continuous Display of Video Objects Using Multi-Zone Disks", Univ. of Southern California, USC-CSE-94-592, Apr. 12, 1995.

Sinah et al., "Intelligent Architectures for Managing Content", Communications Technology Magazine, May 1, 2003.

* cited by examiner

| Schema | Disk span | Disk Region | Popularity (Title Rank) | Resilience | | Integrity | Performance (Max. Bandwidth) |
|---|---|---|---|---|---|---|---|
| | | | | Number of Primary Copies | Number of Secondary Copies | | |
| S1 | 96 | R1 | [0%, 5%] | 8 | 2 | HIGH | 800 Mbps |
| S2 | 48 | R2 | [5%, 10%] | 4 | 0 | HIGH | 600 Mbps |
| S3 | 24 | R3 | [10%, 40%] | 4 | 1 | LOW | 400 Mbps |
| S4 | 16 | R4 | [40%, 75%] | 1 | 2 | LOW | 300 Mbps |
| S5 | 8 | R5 | [75%, 90%] | 1 | 0 | HIGH | 200 Mbps |
| ... | ... | ... | ... | ... | ... | ... | ... |

DISTRIBUTED DATA STORAGE AND ACCESS SYSTEMS

CROSS-REFERENCE TO RELATED APPLICATIONS

This application is related to U.S. patent application Ser. No. 12/170,666, titled "Data Storage in Distributed Systems," filed concurrently with the present application, U.S. patent application Ser. No. 12/170,685, titled "Data Access in Distributed Systems," filed concurrently with the present application, and U.S. patent application Ser. No. 12/170,769, titled "Network Storage," filed concurrently with the present application. The contents of the above applications are incorporated herein by reference.

BACKGROUND

This specification relates to a distributed system for data storage and access.

Distributed network-based data storage, for example accessible over the Internet, has various applications. One application is video storage and access.

During the past decade, online video streaming has gained increasing popularity among Internet users as high speed Internet service is now readily available for households. For example, while traditional video delivery systems (e.g., cable television systems) may no longer satisfy customers' growing demand for convenient access and instant delivery, movie consumers may soon turn to online video stores that may provide such service. However, in practice, it is nontrivial to build an Internet-based storage system, equipped with libraries comparable in size to traditional video rental stores, for providing reliable movie download service to consumers at a reasonable cost. The following example illustrates some of the difficulty behind the idea.

Consider a sample system for a movie download service with 20K movie titles each 2 hrs in length encoded at 2.5 Mbps that is configured to serve 15K simultaneous sessions. In the past, this would have been considered an extensive library for a well-equipped video rental store. (In comparison, NetFlix currently lists a growing number of about 70K+ titles.) Since each movie title occupies about 2.25 GB storage (i.e., 2 hr*2.5 Mb/s*60 sec*60 min/8), the amount of raw storage needed for 20K titles is 45 TB. In addition, if mirroring is used for resilience, the minimum storage required for this entire library is 90 TB, which can be achieved by using approximately 96 1 TB disks organized as e.g., 4 servers each having 24 disk drives.

In the above sample system, the amount of access bandwidth needed for allowing 15K simultaneous sessions is 37.5 Gbps, which would then require ~400 Mbps from each of the 96 disks assuming an equal load over these disks. However, this access rate would exceed common practice for general purpose storage systems. Under typical workloads, a conventional storage system may be able to provide an average bandwidth of 50 Mbps per disk. Even tuned media storage servers that have been configured to supply extraordinary bandwidth of up to about 150~200 Mbps may no longer be sufficient for the sample system. Moreover, the level of difficulty in achieving satisfactory access bandwidth rises progressively with the size of the sample system.

Some approaches to determining a system configuration for such an application may approach the problem at issue essentially as dynamic distributed real-time resource allocation, which is particularly hard to solve for large systems since the problem usually grows with combinatorial complexity as the system expands in size. Briefly, a dynamic distributed real-time resource allocation and scheduling problem in nature can be characterized as an NP complete problem, which means that there are no deterministic solutions computable within a tractable/practical period of time, in other words, the solutions have combinatorial complexity in space and/or time. Traditional approaches to solving NP complete problems often try to restrict the problem in some manner so that the restricted problem is amenable to a deterministic solution. However, such restricted solutions may fail for a number of reasons. For instance, the solution to the restricted problem may not actually reflect the solution to the original problem. Furthermore, when the deterministic solution hits boundary conditions in the problem space, the problem turns combinatorial again, sometimes causing the deterministic solution to produce catastrophic results.

SUMMARY

In general, in one aspect, the invention features a distributed system for content storage and access that includes a storage platform having at least a first storage component, and an access platform having one or multiple access components, each access component associated with at least one of a plurality of access services including an administrative service for receiving a service request initiated by a first user, the service request being associated with a first item of content, and for identifying a characteristic of the service request, a content management service for determining, based at least in part on the characteristic of the service request, a specification of a data transfer operation to be executed in association with the first storage component, and a directory service for maintaining information associated with the first item of content.

Aspects of the invention may include one of more of the following features.

The specification of the data transfer operation may include an identifier of a data transfer operation type and a persistent fully-resolvable identifier for an element of the first storage component.

The service request may include an upload request.

The content management service may include an upload service for allocating resources of the first storage component to determine a partial resource allocation arrangement in response to the upload request, and further to commit a complete resource allocation arrangement according to the partial resource allocation arrangement. The specification of the data transfer operation may include a description of the complete resource allocation arrangement.

The upload request may include a first set of attributes that characterizes one or more operational objectives of a first item of content, and the upload service determines the complete resource allocation arrangement based at least in part on one or more of the first set of attributes.

The upload request may further include the first item of content, and the data transfer operation may include storing elements of the first item of content in respective elements of the allocated resources of the first storage component according to the complete resource allocation arrangement.

The directory service may maintain a description of a result of storing elements of the first item of content in respective elements of the allocation resources of the first storage component.

The description of the result of storing elements of the first item of content may enable locating the first item of content in the allocated resources of the first storage component with specificity for further access operations.

The service request may include a download request.

The content management service may include a download service for identifying, by interacting with the directory service, an existing resource allocation arrangement associated with the first item of content in response to the download request. The data transfer operation may include a download operation.

The directory service may maintain a description of the existing resource allocation arrangement, including associations of elements of the first item of content with respective elements of the first storage component allocated to the first item.

The download service may perform a set of inquires to determine whether a condition for initiating the download operation is satisfied.

The set of inquires may include an assessment of one or more of the following: an overall workload condition of the first storage component, a deviation in load across the respective elements of the first storage component associated with the element of the first item, availability of resources to be involved with the data transfer operation, and a present level of resource utilization by various operations in the distributes system associated with first item of content.

Upon satisfaction of the condition for initiating the data transfer operation, the download service may determine the specification of the download operation, including a selected set of elements among the elements of the first storage component associated with the first item to be accessed for the download operation.

The first storage component may include one or multiple storage devices selected from at least one of the following types: disk drives, solid-state memories, and non-volatile memories.

The service requests may include a plurality of attributes comprising one or more of the following: name, data length, data type, and a set of attributes characterizing one or more operational objectives of a plurality of items of the content.

The one or more operational objectives may include one or more of the following: popularity, integrity, resilience, accessibility, power consumption, geographical affinity and exclusion, and topological affinity and exclusion.

The plurality of access services may further comprises a system management service for coordinating operations performed by one or multiple of the plurality of access services in the distributed system.

The distributed system may further include a plurality of access service platforms, each having one or multiple access components. At least one of the plurality of access services provided by the access components may be distributed in multiple instances across one or multiple access service platforms.

The directory service may provide an interface to a persistent database that is used to store information associated with content being handled by the distributed system.

The administrative service may provide a secure means to receive a particular type of service request based on a verification of an identity of the first user.

The data transfer operation may include one or more of the following types: upload, download, delete, and move.

Other general aspects include other combinations of the aspects and features described above and other aspects and features expressed as methods, apparatus, systems, computer program products, and in other ways.

Other features and advantages of the invention are apparent from the following description, and from the claims.

DETAILED DESCRIPTIONS

1 System Overview

Figure 1:
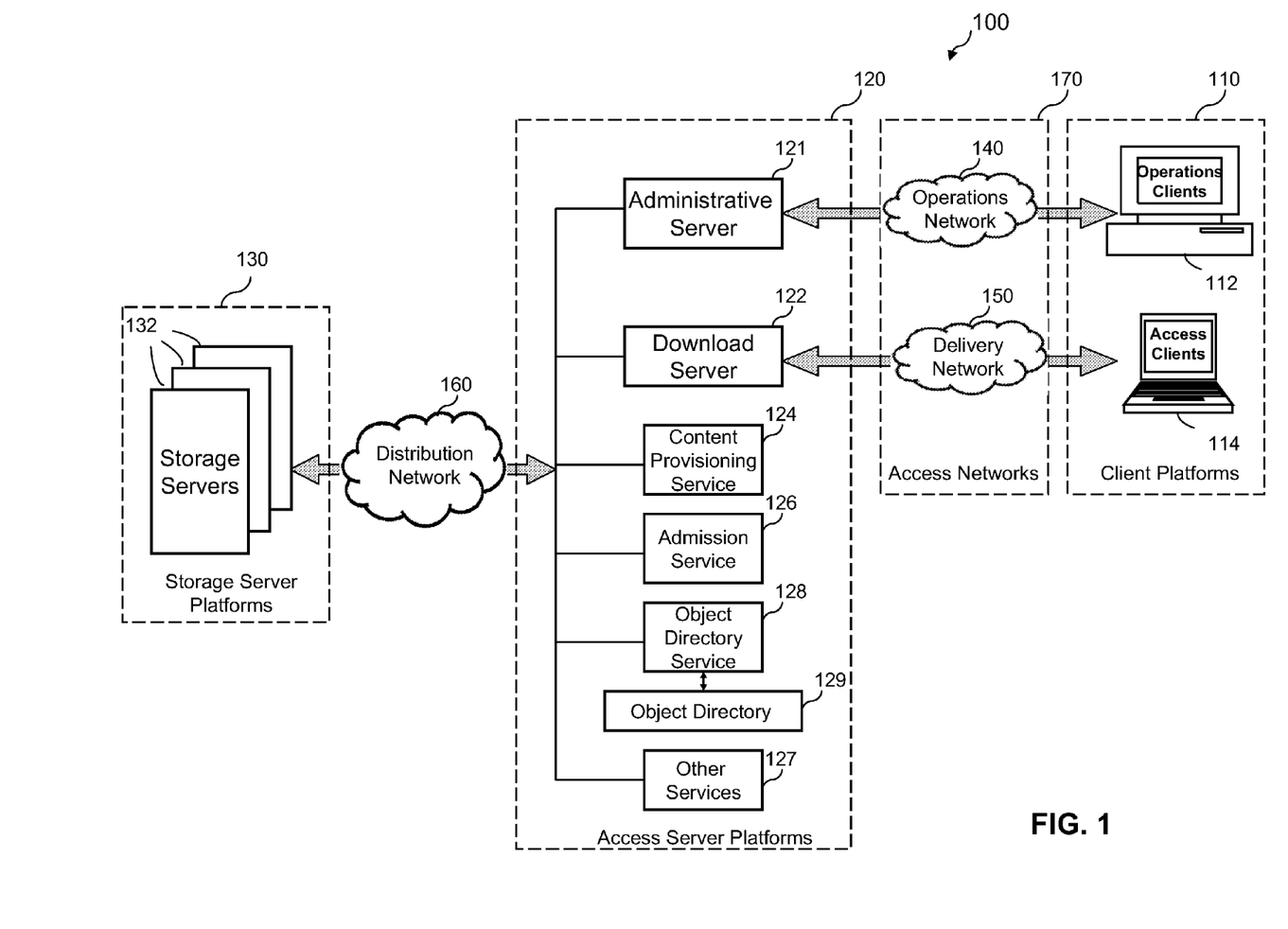
FIG. 1 is a block diagram of an exemplary distributed system for data storage and access.

Referring to FIG. 1, a distributed system 100 consists of three basic types of computing platforms for content storage and delivery: storage server platforms 130, access server platforms 120, and client platforms 110. The term "platform" is used to refer to a collection of components, which may, for example, be hosted on a single computer, or distributed over multiple computers.

The storage server platforms 130 may host multiple storage servers 132, each of which in turn coordinate access to a set of storage resources, providing the capability to read and write data. For example, each server may be hosted on one computer, or its function may itself be distributed on multiple hardware elements. Each storage server may include one or multiple storage devices of various types. Examples of storage devices include disk drives, solid-state memories (such as RAM), and non-volatile memories (such as flash).

The access server platforms 120 provide access services that collectively provide one or more methods of accessing data/content with respect to storage servers of the system. Some access services handle the data according to a prescribed access protocol/regime/interface (e.g., HTTP, RTSP, NFS, etc). Other access services manage the resources of the system and regulate access to content accordingly. Services that manage resources of the system include, for example, a content provisioning service 124, which allocates resources of the system to store and deliver content, and an admission service 126, which admits sessions when called upon by various session requests in the system.

In general, the access server platforms 120 are physically bounded on one side by the distribution network 160, which provides an interconnection between the storage server platforms 130 and the access server platforms 120, and on the other side by access networks 170, which provide interconnections between the client platforms 110 and the access server platforms 120. Note that different access services provided by one or multiple access server platforms may also communicate over the distribution network 160 or by some other network in the system. The access networks 170 include an operations network 140 over which one or more operations clients 112 (e.g., administrators of online video stores) communicate with the access server platforms 120, and a delivery network 150 over which one or more access clients 114 (e.g., customers of online video stores) communicate with the access server platforms 120.

The access server platforms 120 host one or more externally accessible administrative servers 121, which provides an interface linking the operations network 140 to services of the access server platforms 120 and the storage server platform 130, for example, to provide a secure means to ingest, retrieve and verify content stored within the system. Through an administrative server 121, operations clients 112 are given administrative access to the system, for example: 1) to upload content to the system; 2) to download content from the system; 3) to delete existing content from the system; and etc. In some examples in which the administrative server 121 provides a software interface to operations clients using the HTTP protocol, these administrative accesses may correspond to the HTTP methods of "PUT," "GET," and "DELETE," respectively or to some other combination of HTTP methods, "POST" and "DELETE" for example. Preferably, access to the administrative server 121 is privileged to operations clients 112.

The access server platforms 120 also host one or more externally accessible download servers 122. Through a download server 122, access clients 114 may request to stream or download content from the system for example, according to a defined set of rules (a regime or protocol) for streaming and downloading content.

As illustrated in FIG. 1, no direct link between the storage and the client is required because storage and access functions are decoupled in the system. When a client performs an operation, e.g., uploading or downloading content, the administrative server 121 or download server 122 communicates on behalf of its client to the storage servers, mainly to put or get data to or from storage resources, and to other elements in the system, e.g., to locate resources and control admissions. This separation of storage and access brings flexibility to the configuration and evolution of the system, and significantly reduce the system's reliance on synchronization, which tends to overwhelm a distributed system as it scales.

Upon receiving upload request from the operation clients 112, the administrative server 121 receives inputs that contain an external name (e.g., a URI, namely, a Uniform Resource Identifier) of the content to be uploaded, and the content itself (e.g., binary data encoding a video stream). Upon receiving download request from the access clients 114 or operations clients 112, the download server 122 or the administrative server 121, respectively, receives the external name (e.g., also a URI) of the content to be downloaded, and if possible provides the requested content.

In some examples, the administrative server 121 may acquire from the operations clients (e.g., receive with the request) a set of attributes along with an upload or download request that are used by the administrate server 121 in servicing the request. Attributes can include e.g., provisioning attributes, access attributes, and admission attributes. An illustrative example of an attribute provided with an upload is the maximum concurrent streaming sessions allowed for a particular piece (i.e., a title or object) of content. For example, if the content is restricted to a maximum of 5 concurrent sessions, the content provisioning service may determine a good arrangement of the data for that piece on the storage servers, and later the admission service may refuse a download request if it would exceed the limit of 5 sessions.

An object directory service 128 provides an interface to a persistent database (e.g., an object directory 129) that is used to store information associated with objects being handled by the system. One example of information that may be stored is the assignment of external names to internal object identifiers (OIDs). A second example is information describing where content is located on the storage servers/storage resources of the system. Elaborating on this second example, the object directory 129 may contain a map table associated with a particular movie title describing how the data for the title is stored on the storage servers, including the number of copies of the title being kept and the disk drives and the specific blocks where each copy is located. A third example is information representing provisioning attributes (e.g., peak cumulative access bandwidth for the content and resilience factors), admissions attributes (e.g., attributes that govern whether sessions involving the content are allowed to be created or not), and access attributes (e.g., attributes that govern at what rate data is delivered for sessions involving the content).

It should be understood that the data stored in the object directory is not limited to these examples, but could be any type and/or amount of data including the data for the externally referenced object in its entirety.

In the following sections, the use of content provisioning and admission services is described in greater detail in the context of two principal operations in the distributed system 100—"UPLOAD" and "DOWNLOAD" operations.

2 Example of "UPLOAD" Operation

Figure 2:
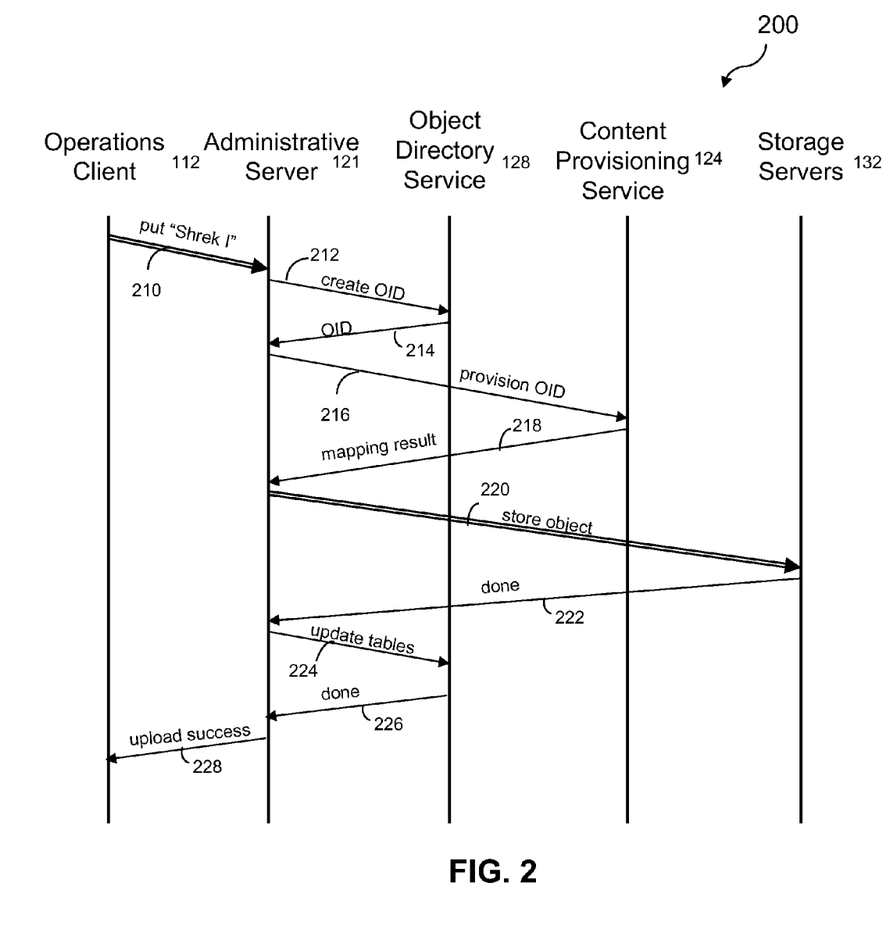
FIG. 2 is a representation of the flow of events during an "UPLOAD" operation when an operations client uploads content to storage servers.

Referring to FIG. 2, in an example of an "UPLOAD" operation 200, an operations client 112 initiates a request 210 through the administrative server 121 for uploading a movie (e.g., "Shrek I") to the system. Data received by the administrative server along with request 210 includes the external name for the content of "Shrek I" and the movie content itself. Note arrows in the figure represent logically uni-directional communications from one interface to another (although the underlying protocol may in fact include e.g., bidirectional handshakes etc), and double arrows indicate there is actual data content being delivered along that communication. In addition to the external name and the movie content, the client may provide attributes, including traditional attributes (such as content size and content type) and a collection of non-traditional attributes (such as maximum concurrent access sessions, popularity, resilience, integrity, life cycle, and topological and geographical attributes) that affects the handling of each content.

Upon receiving the external name, the administrative server sends the name in a command 212 requesting the object directory service 128 to create an object for "Shrek I" and to generate an OID mapping for the external name. Once the object is successfully created, the object directory service 128 delivers a message 214 to inform the administrative server 121. Subsequently, the administrative server calls the content provisioning service 124 via a request 216 to provision the content. Also along with request 216, the administrative server passes provisioning attributes of the content, which are used during content provisioning to decide what resources of the system, if available, to allocate to the content.

During system configuration, a set of potential resource arrangements can be pre-determined for content with certain types of provisioning attributes, where each arrangement represents, for example, a way of striping copies of content across one or several storage resources of the system. This enables the content provisioning service to make an efficient provisioning decision. For example, the content provisioning service uses the attributes to find and evaluate a best mapping, for example by approximating server occupancy at the given time and finding possible sets of servers that can be used to meet the content requirements (e.g., performance requirements) of the content.

Here, a mapping generally refers to information describing a potential arrangement of the data for an object on storage resources of the system, including e.g., the set of disk drives to be used and the associated disk region on each drive. If the best mapping is permissible, meaning the content provisioning service can, in this example, allocate sufficient blocks in the selected disks to the content without threatening overall system performance, the content provisioning service sends a message 218 to the administrative server carrying the mapping result. Based on the mapping result, the administrative server then writes the content to the allocated blocks on the storage servers 132 via a set of messages 220. In some situations when multiple copies of the content are desired on the system, the content provisioning service may determine a best mapping for each copy individually.

In some cases, the best mapping may fail due to conflicts in resource allocation. For example, among other pieces of content being provisioned, one may have occupied certain blocks on a disk drive which also happens to be included in the mapping result of "Shrek I". In those situations, a new mapping for "Shrek I" is selected to repeat the evaluation process until a permissible mapping has been found. Subsequently, the administrative server writes the content to the blocks on the disk drives allocated by the mapping or set of mappings.

After content transfer is complete, the storage servers send a "done" signal 222 to the administrative server, which then instructs the object directory service to document the committed mapping (via message 224), so that the object directory can identify the location of the content for subsequent access by clients. Upon receiving a "done" message 226 from the object directory service reporting completion of updates, the administrative server notifies the operations client (via an "upload success" message 228) that the "UPLOAD" operations has been successfully completed.

3 Example of "DOWNLOAD" Operation

Figure 3:
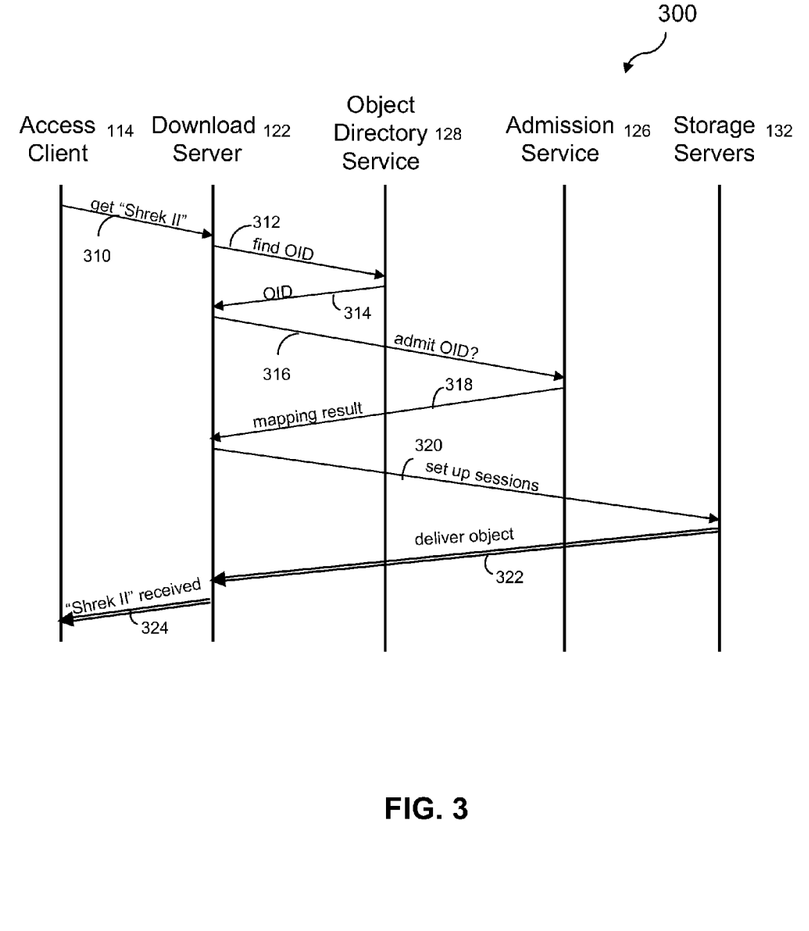
FIG. 3 is a representation of the flow of events during a "DOWNLOAD" operation when an access client downloads content from storage servers.

Referring to FIG. 3, in an example of a "DOWNLOAD" operation 300, an access client initiates a request 310 through the download server 122 for downloading a desired movie (e.g., "Shrek II"). After receiving the external name of the content of "Shrek II", in general, the download server 122 makes use of the services in the access server platforms to determine whether the request for the content can or should be admitted and if so, how the content should be obtained from the storage servers. In particular, using the external name, the download server 122 calls the object directory service 128 via a request 312 to discover whether the object exists and if so, to locate the corresponding object value in the object directory. Given the object exists, the object directory service returns the object value to the download server via a message 314. The object value contains the object's OID, some or all associated mappings (or partial mappings) that describe a set of storage resources holding the content, and other attributes associated with the content. Subsequently, the download server 122 calls on the admission service 126 to determine whether or not to admit the download request of the content, and if yes, how this download request should be handled.

The admission service 126, in general, is configured to admit combinations of sessions that are consistent with a workload that can be supported by the resources of the system, and to deny sessions that threaten the integrity of existing sessions when the system is near saturation. Therefore, prior to granting/denying an upload or download request, the admission service first checks the usage and availability of various system resources. In one embodiment and this example of "DOWNLOAD" operation, resource checks/reservations are conducted by the admission service, including, for example: 1) checking the bandwidth allocated to existing sessions involving the same content "Shrek II" to make sure that the prospective new session will not cause the content to become oversubscribed; 2) checking the available server resources to determine which one of possible multiple copies of the content provides the greatest serviceability (e.g., the service bandwidth that would remain available on the most heavily used server of a copy) and reserving the storage servers associated with this copy; and 3) checking and reserving available unit resources (e.g., disk time or bandwidth) on the reserved storage servers to be accessed for downloading. In addition, there are many other types of resources that need to be allocated or checked, depending on the implementation. For example, access server/platform capacity may be checked and the admission service might respond with a message indicating that the access server should redirect the client to a different access server.

In determining which of the multiple copies of the content on the storage servers 132 is to be accessed to satisfy this download request, generally, the admission service selects the copy with the lowest average server load, though deviation in load across the set of servers may also be taken into account. For instance, a copy with a low average and a high deviation may be less desirable than a copy with a moderately higher average, but low deviation. Moreover, it is desirable to include a certain amount of statistical spread in the choice to ensure that lightly loaded resources will not get overwhelmed (a condition that can happen during session failure recoveries). On occasion, if none of the copies has sufficient resources available at the moment, the session is denied.

When the admission service 126 decides to admit the download request and selects the copy of content to service the client, it sends a message 318 with the mapping of the selected copy to the download server 122, which then requests the storage servers via message 320 to set up download sessions with the identified blocks on the storage servers. Subsequently, the content of "Shrek II" is delivered from storage to the download server and passed on to the access client via data lines 322 and 324, respectively. By the time the client receives the entire data content of the movie "Shrek II", the "DOWNLOAD" operation completes. When the "DOWNLOAD" operation terminates or completes, the resources reserved for it are released or marked for later garbage collection.

4 Example of Attributes-Based Content Provisioning Service

In the exemplary "UPLOAD" operation described above, the content provisioning service 140 makes use of provisioning attributes to find a best mapping of arranging the content on the storage servers that can satisfy the requirements (e.g., performance requirements) of the content. One example of a performance requirement is the access bandwidth, which relates to the maximum number of concurrent sessions permissible to access the content at any given time. The following example illustrates how the content provisioning service may determine a best mapping that supports the access bandwidth requirement, by using a particular provisioning attribute—maximum concurrent streaming sessions.

Figure 4A:
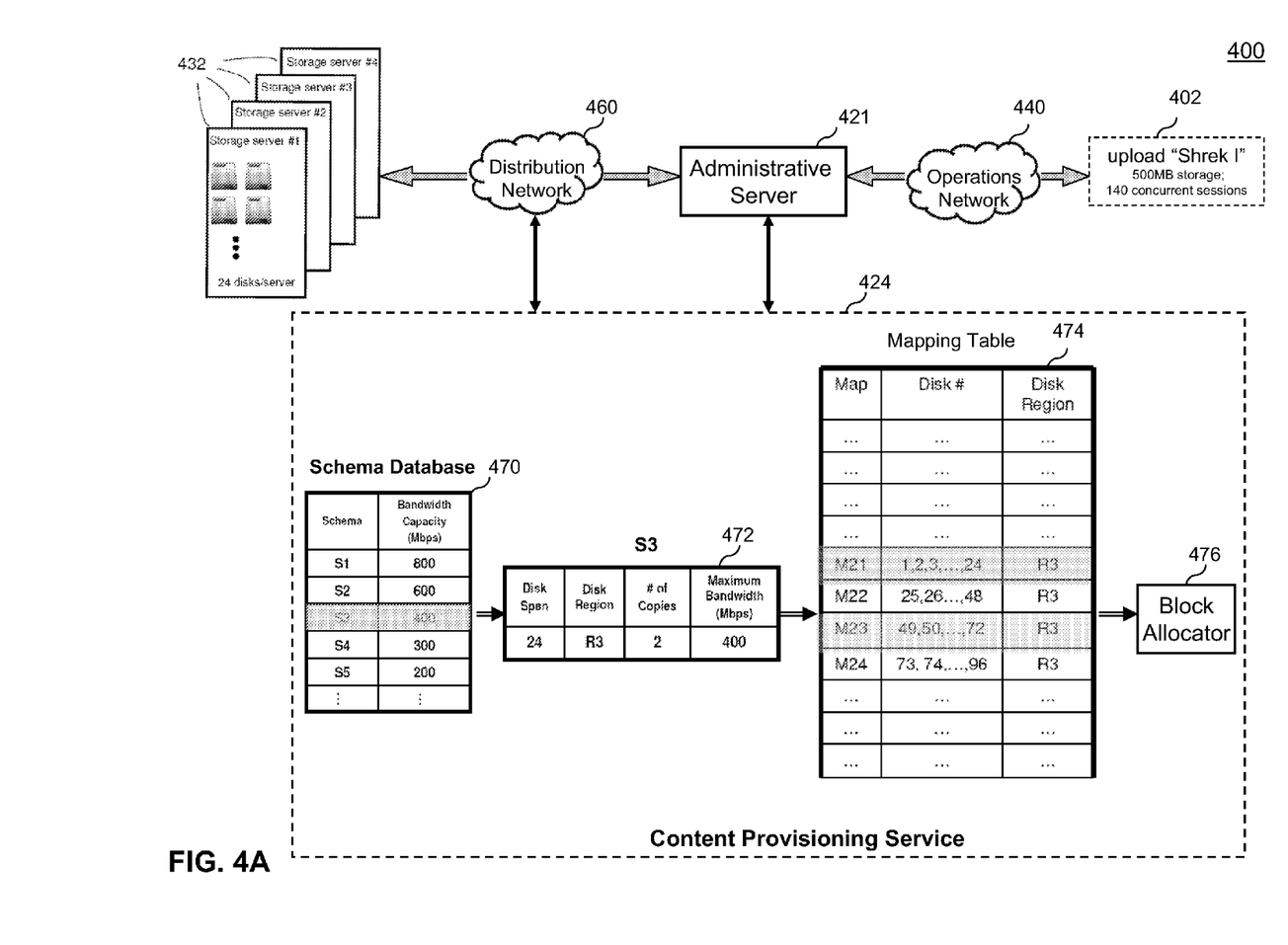
FIG. 4A is a diagram of the system handling an exemplary upload request.

Referring to FIG. 4A, for example, a system 400 is designed to host a movie library of about 20K titles, with each copy of the title occupying ~500 MB storage space and a client access rate of 2.5 Mbps. Assume the system 400 has 96 1 TB disk drives uniformly distributed across four storage servers 432, providing a storage capacity of 96 TB. For each disk drive, for example, a 100 Mbps access bandwidth amounts to an access capacity (i.e., maximum access bandwidth) of 9.6 Gbps for the system. (Note that other examples may have different movie characteristics and system storage and access capacities. For example, for a title encoded at 2.5 Mbps with an approximate length of 100 minutes, each copy occupies ~2 GB storage space. With mirroring, 20K titles would then take up about 80 TB of storage space (e.g., 80 1 TB disk drives). Given that each disk has 400 Mbps of access bandwidth, the total access bandwidth of the system may be up to ~32 Gbps.)

To make a good arrangement of resource allocation to each title in the library, a general approach of the system is to distribute content of higher demands across a greater number of disks, so that the aggregate access bandwidth for the content is sufficient to support all the concurrent streaming sessions at peak usage.

For example, when the administrative server 421 receives a request 402 from an operations client for uploading the movie of "Shrek I" to storage, it is also informed that, for "Shrek I", up to 140 concurrent streaming sessions may occur at any given time, suggesting a peak streaming rate of 350 Mbps (here, assume the movie is encoded at 2.5 Mbps). With each disk drive supporting an access rate of 100 Mbps at maximum, 350 Mbps bandwidth can not be achieved unless the movie data is stripped across an absolute minimum of 4 disk drives. Thus, one option for the content provisioning service to distribute the content is to map the data to 4 disk drives, although this may not be a very good option because when this title is in peak usage the other data on the 4 drives can be rendered inaccessible (an example of inter-title contention). Better options take into account inter-title contention and thus disperse such data more broadly, say over 6, 12, or even 24 disk drives. In general, there exist a collection of such mappings that each can meet the 350 Mbps bandwidth requirement of servicing the content.

Here, such a collection of mappings with a common objective (e.g., bandwidth capacity) is called a schema. As for the sample movie library, each title has a corresponding schema that satisfies the content requirements (such as access bandwidth) of that title.

Computing the schema to meet the requirements of each title is non-trivial and the level of difficulty often grows progressively with system size. Therefore, in some examples, in order to reduce the burden on content provisioning service, a set of schemas are pre-computed, for example, based on an expected or modeled distribution of attributes, and stored in a database made available for use to the content provisioning service 424. This pre-computed set of schemas is used to reduce computational cost and improve overall system efficiency.

Figure 4B:
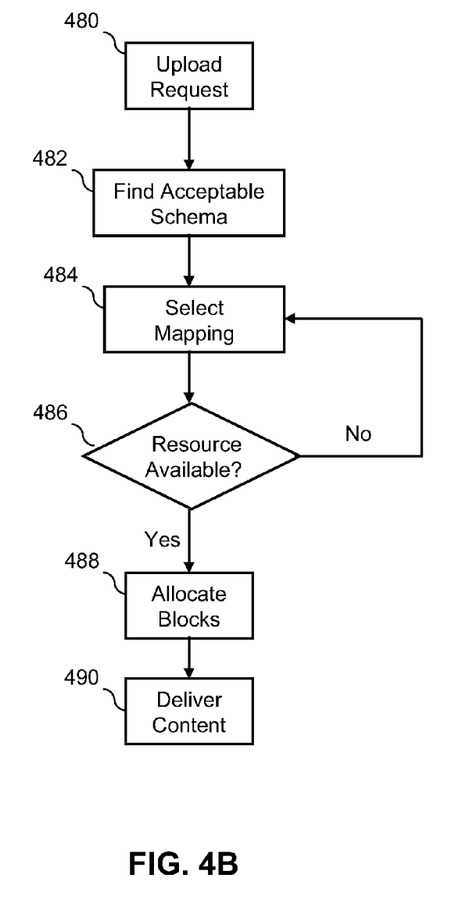
FIG. 4B is a flow chart of a content provisioning process.

Referring to FIG. 4B, by using a pre-computed schema database, the sample system 400 provisions content in the following way. First, upon receiving an upload request 480, the content provisioning service 424 finds from the schema database an acceptable schema that complies with the requirements of the content, during step 482. Next, among the mappings associated with the selected schema, the content provisioning service determines a best mapping, for example, the mapping with the lowest server occupancy, during step 484. If, in a following step 486, sufficient resource can be found on disk drives specified in the best mapping, the content provisioning service 424 then allocates a group of blocks on each disk drive to the content (step 488) before the content delivery process starts (step 490). If however, the content provisioning service 424 fails to locate sufficient resource in the best mapping during step 486, it select an alternative mapping in the schema to repeat step 486 until an acceptable one is found to proceed the block allocation.

This general concept of attributes-based content provisioning using schemas is further illustrated in the example of uploading "Shrek I", shown in FIG. 4A. As previously discussed, a 350 Mbps access bandwidth is desired in this case. Therefore, in this schema database 470, schema S3 (shown as table 472) with a bandwidth capacity of 400 Mbps is considered an acceptable schema by the content provisioning service 424. This schema S3 further states that, for each content that falls in this category, two copies of the content will be stored on the system, with each copy distributed over 24 disks and written in region R3 of each disk.

Following the selection of S3, a mapping table 474 is populated to describe a set of possible mappings of the schema to disk drives. For example, in this mapping table 474, M21, M22, M23, and M24 correspond to four orthogonal mappings of S3 to the storage, each mapping using a specific set of disks (such as disks 1 through 24 in M21) and a designated disk region (R3). Among all possible mappings associated with schema S3, the content provisioning service seeks a best mapping for each copy of the content, for example by approximating server occupancy at the given time. In this example, the content provisioning service selects mappings M21 and M23 for storing two copies of "Shrek I", respectively. If these two mappings are found to be permissible, a block allocator 476 commits allocation of blocks on disk drives according to these mappings. Once the allocated blocks are available and reserved for occupancy, the administrative service 421 writes the content data via the distribution network 460 to the storage servers 432.

5 Examples of Content Provisioning Using Multiple Attributes

In some applications, the content provisioning service makes use of multiple attributes to find the best mapping of arranging the content on the storage servers. Examples of such attributes include attributes that characterize popularity, resilience, and integrity.

Popularity is an expression of anticipated demand for a piece of content. For example, if content is popular, demand for it will likely be high, and thus the provisioning system will attempt to provision the content with the resources necessary to meet the expected demand.

Resilience relates to a predicted level of service maintained to an information object in the presence of component failure. For example, in accessing a resilient object, a customer encountering a failed read on disk A can continue to be serviced through reading an alternative copy of data on disk B. Generally, the more resilient an object needs to be, the more resources (and possibly the more types of resources) the content provisioning system needs to allocate to that object.

Integrity relates to the ability to recover content after a component failure, even a catastrophic failure of the system. For example, if a disk fails completely and is unrecoverable, the portions of content contained on the disk can be recovered from an alternate copy of the content within the system or across systems and/or from an encoded reconstruction method.

Depending on the implementation, the content provisioning service may determine the best mapping for storing a piece of content that provides a satisfactory degree of popularity, resilience and/or integrity to that piece of content.

Figure 5:
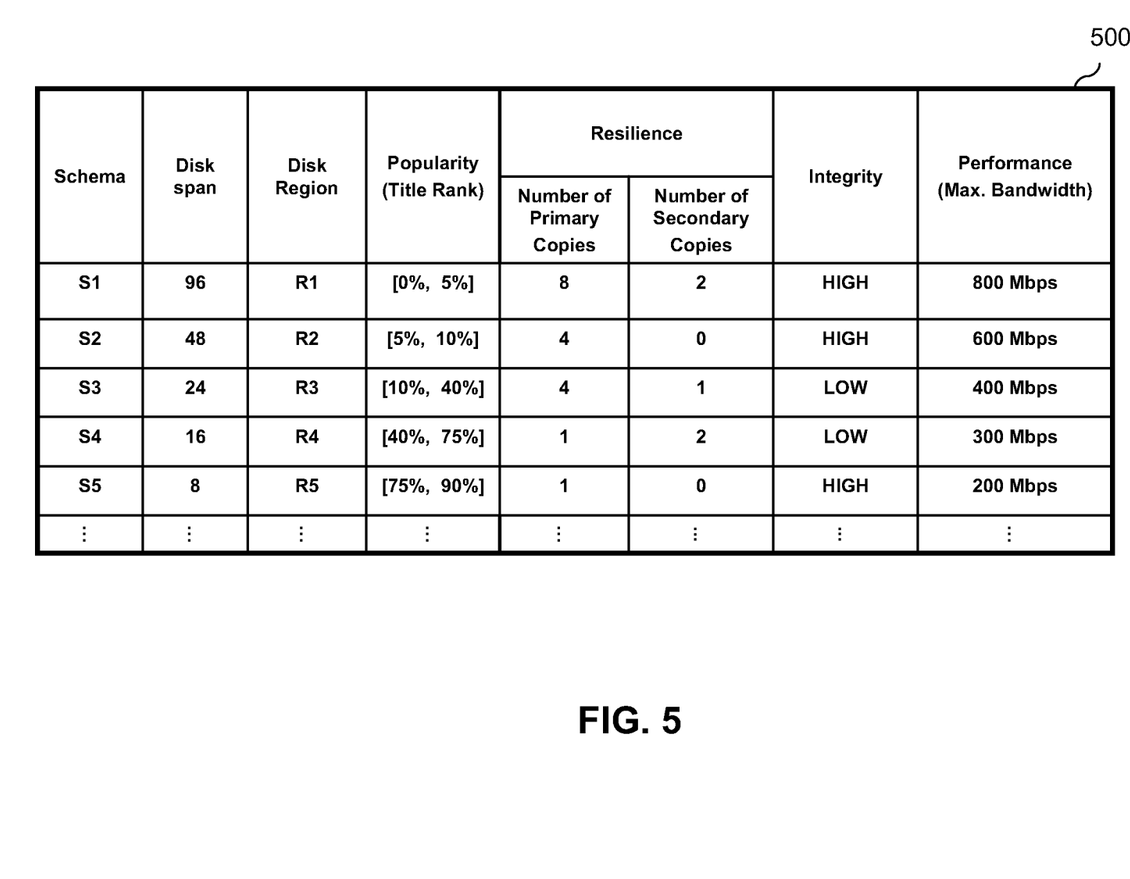
FIG. 5 shows exemplary schemas associated with multiple attributes.

Referring to FIG. 5, some schemas that provide different degrees of popularity, resilience, and integrity are shown in schema table 500. For example, referring to schema 4 (S4), in uploading a relatively low popularity title that requires a certain degree of resilience, one primary copy is provided to satisfy the popularity demand. In the mean time, two secondary copies of the title are stored to ensure that in the case of a failed read on the primary copy, customers are still able to access this title through the secondary copies without experiencing service interruption. Schema 5 (S5) provides another scenario of uploading a relatively low popularity title that is nevertheless important such that a high level of integrity is desired. Here, high level of integrity can be provided for example, by using advanced redundancy codes (although this can be computational expensive).

In some prior art systems, resilience and integrity are generally implicit and bound together within a storage redundancy method (e.g., RAID 5). In this description, one advantage of decoupling and making explicit the way resilience and integrity requirements are handled for each piece of content, is in allowing a system to support a combination of each requirement on a title by title basis and to use the most appropriate methods in satisfying the combination.

6 Other Examples of the Distributed System

Referring again to FIG. 1, in some examples, the access server platforms 120 of the distributed system 100 may provide other types of access services 127 in addition to the services described above. One example is a content re-provisioning service, which may decide to re-provision (including up and down provision) content in situations such as the occurrence of usage anomaly and content aging. Another example is a management service, which may coordinate the configuration, monitoring, control and data collection in the system. The management service may track both normal and exceptional events to diagnose system problems and anomalies and when necessary, trigger other services (such as re-provisioning services) in the system to perform subsequent actions.

Each service provided by the system may be implemented in various manners. In some examples, services may be bound to a particular platform (e.g., servers). Although such services are not individually resilient to occurrence of component failures, system resilience can be achieved by virtue of service replication and session level reassignment. In some examples, services may be distributed in multiple instances across a set of platforms. Distribution may be accomplished by partitioning the problem space (e.g., by process-pipelining, or by object-symmetric concurrency, etc.) to a degree necessary to achieve the performance and resilience requirement of the service. In some other examples, services can migrate from one platform to another. In particular, if a service is not implemented in a distributed manner, migration allows services to be relocated to other platforms in the system in case of service failure or degradation on one platform.

In some implementations, a storage server platform can be a well configured off-the-shelf computing system equipped with storage controller and network controller cards, configured to provide e.g., 10 GbE line-rate access to a set of storage resources (e.g., disks, memory). Controller cards can either be developed internally or qualified from readily available third party sources. In some examples, storage controllers provide unfettered high bandwidth access to the underlying storage devices. Examples of storage devices include disk drives, solid-state memories (such as RAM), and non-volatile memories (such as flash).

In some implementations, an access server platform can be a well configured off-the-shelf computing system equipped with network controller cards, configured to support a set of access regimes to content stored in the system. Access regimes are provided by access servers that may adopt a multitude of protocols and vary widely in performance and efficiency. One example of an access server is a Microsoft Windows Media Server (WMS), commonly used for streaming media on the Internet. Another example is an HTTP server, which uses HTTP protocol to provide clients access to content on the system. A third example is an Adobe's Flash Media Server.

Note that administrative servers and download servers are just two of potentially many types of access servers. Access servers are the general class of services that provide external access to objects in the system according to prescribed sets of rules.

Although the access servers (and services) and storage servers (and services) have been described as residing respectively on access and storage platforms, in some embodiments, a combination or all of access and storage servers and services can be configured to reside on a common platform.

In some embodiments, operations network 140 is isolated from the delivery network 150. The administrative server 121 and download server 122 may be exclusively accessible to the operations clients 112 and access clients 114, respectively. The download server 122 may provide features or semantics that are not suitable for operations clients, and vice versa.

Referring again to FIG. 1, some or all of the links between components described in this description can use protocols that are described in U.S. patent application Ser. No. 12/170,769, titled "Network Storage," filed concurrently with the present application, the contents of which are incorporated herein by reference in its entirety.

It is to be understood that the foregoing description is intended to illustrate and not to limit the scope of the invention, which is defined by the scope of the appended claims. Other embodiments are within the scope of the following claims.

What is claimed is:
1. A method comprising:
receiving, by a server, a request to upload media content, the request including information identifying one or more values of one or more attributes associated with providing access to the media content;
identifying, by the server and based on the one or more attributes, a set of schemas, of a plurality of sets of schemas;
identifying, by the server, a schema, of the identified set of schemas, based on the one or more values;
each schema, of the identified set of schemas, being associated with at least one of the one or more values and including a collection of mappings that includes information identifying an arrangement for storing the media content on one or more storage resources based on the at least one of the one or more values;
storing, by the server and at a first time, the media content on the one or more storage resources based on one or more mappings of the collection of mappings included in the identified schema;
receiving a request to access the stored media content;
determining whether to grant the request to access the stored media content,
determining whether to grant the request to access the stored media content including:
determining a maximum quantity of concurrent streaming sessions associated with the stored media content; and
granting the request to access the stored media content when a current quantity of concurrent streaming sessions associated with the stored media content is less than the maximum quantity of concurrent streaming sessions; and
providing, by the server and based on determining to grant the request to access the stored media content, the stored media content to one or more devices at a second time, the second time occurring after the first time.

2. The method of claim 1, further comprising:
determining, based on the schema, a quantity of copies of the media content to be stored on the one or more storage resources; and
identifying a particular mapping, of the collection of mappings, for storing each copy of the quantity of copies, where storing the media content includes:
stored each copy of the quantity of copies based on the particular mapping.

3. The method of claim 1, where storing the media content includes:
selecting a first mapping, of the one or more mappings, based on the one or more values,
where the first mapping includes a first arrangement for storing the media content on the one or more storage resources;
determining whether a resource, of the one or more storage resources, associated with the first arrangement is available for storing the media content;
selecting a second mapping, of the one or more mappings, when the resource is not available for storing the media content,
where the second mapping includes a second arrangement for storing the media content on the one or more storage resources,
the second arrangement being different from the first arrangement; and
storing the media content on the one or more storage resources based on the second arrangement.

4. The method of claim 1, where
the request to upload the media content includes an identifier associated with the media content, and
the method further comprises:
creating an object associated with the identifier based on receiving the request to upload the media content;
storing, in a memory associated with the server, at least one of:
information associated with the one or more values, or
information associated with the one or more mappings; and
associating the object with the at least one of the stored information associated with the one or more values or the stored information associated with the one or more mappings.

5. The method of claim 4,
the request to access the stored media content includes the identifier, the method further includes:
identifying the object based on the identifier included in the request to access the media content; and
identifying the at least one of the stored information associated with the one or more values or the stored information associated with the one or more mappings based on identifying the object; and
when determining whether to grant the request to access the media content, the method includes:
determining whether to grant the request to access the media content further based on the at least one of the stored information associated with the one or more values or the stored information associated with the one or more mappings.

6. The method of claim 5, where, when determining whether to grant the request to access the media content, the method further includes:
determining, based on the at least one of the stored information associated with the one or more values or the stored information associated with the one or more mappings, an availability of resources associated with the one or more mappings; and
granting the request to access the media content when the resources associated with the one or more mappings are available.

7. The method of claim 4, where, when determining the maximum quantity of concurrent streaming sessions associated with the media content, the method includes:
determining the maximum quantity of concurrent streaming sessions associated with the media content based on the at least one of the stored information associated with the one or more values or the stored information associated with the one or more mappings.

8. A non-transitory computer-readable medium comprising instructions, the instructions including:
one or more instructions which, when executed by one or more processors, cause the one or more processors to:
receive a request to upload media content,
the request including information identifying one or more values of one or more attributes associated with providing access to the media content;
identify, based on the one or more attributes, a set of resource arrangements for storing the media content on one or more storage resources,
each resource arrangement, of the set of resource arrangements, being associated with at least one of the one or more attributes and including information identifying a plurality of mappings for storing the media content on the one or more storage resources;
select a first resource arrangement, of the set of resource arrangements, based on the one or more values;
store, at a first time, the media content on the one or more storage resources based on the first resource arrangement;
receive a request to access the stored media content;
determine whether to grant the request to access the stored media content,
the one or more instructions to determine whether to grant the request to access the stored media content including:
one or more instructions to determine a maximum quantity of concurrent streaming sessions associated with the stored media content; and
one or more instructions to grant the request to access the stored media content when a current quantity of concurrent streaming sessions associated with the stored media content is less than the maximum quantity of concurrent streaming sessions; and
provide, at a second time based on determining to grant the request to access the stored media content, the stored media content to one or more devices,
the second time occurring after the first time.

9. The computer-readable medium of claim 8, where the instructions further include:
one or more instructions to determine, prior to receiving the request to upload the media content, a plurality of sets of resource arrangements,
where the plurality of sets of resource arrangements include the set of resource arrangements, and
where each set of resource arrangements, of the plurality of sets of resource arrangements, is associated with at least one of a plurality of attributes associated with providing access to the media content, the plurality of attributes including the one or more attributes.

10. The computer-readable medium of claim 8, where the instructions further include:
one or more instructions to determine, based on the set of resource arrangements, a quantity of copies of the media content to be stored on the one or more storage resources; and
one or more instructions to identify a particular mapping, of the plurality of mappings, for storing each copy of the media content,
where the one or more instructions to store the media content include:
one or more instructions to store each copy of the media content based on the particular mapping identified for storing each copy of the media content.

11. The computer-readable medium of claim 8, where the one or more instructions to select the first resource arrangement include:
one or more instructions to select a first mapping, of the plurality of mappings, based on the one or more values, where the first mapping is associated with a first resource of the one or more storage resources;
one or more instructions to determine whether the first resource is available for storing the media content; and
one or more instructions to select a second mapping, of the plurality of mappings, when the first resource is not available,
where the second mapping is not associated with the first resource, and
where the second mapping is different from the first mapping.

12. The computer-readable medium of claim 8, where the request to upload the media content includes information identifying a name associated with the media content, and
the instructions further include:
one or more instructions to create an object associated with the name based on receiving the request to upload the media content;
one or more instructions to store at least one of:
information associated with the one or more values, or
information associated with the one or more mappings; and
one or more instructions to associate the object with the at least one of the stored information associated with the one or more values or the stored information associated with the one or more mappings.

13. The computer-readable medium of claim 12, where the request to access the stored media content includes information identifying the name,
the instructions further include:
one or more instructions to identify the object based on the name; and
one or more instructions to identify the at least one of the stored information associated with the one or more values or the stored information associated with the one or more mappings based on the object, and
the one or more instructions to determine whether to grant the request to access the media content include:
one or more instructions to determine whether to grant the request to access the media content further based on the at least one of the stored information associated with the one or more values or the stored information associated with the one or more mappings.

14. The computer-readable medium of claim 12, where the one or more instructions to determine the maximum quantity of concurrent streaming sessions associated with the media content, include:
one or more instructions to determine the maximum quantity of concurrent streaming sessions associated with the media content based on the at least one of the stored information associated with the one or more values or the stored information associated with the one or more mappings.

15. A system comprising:
one or more devices, implemented at least partially in hardware, to:
receive a request to upload media content,
the request including information identifying one or more values of one or more attributes associated with providing access to the media content;
identify, based on the one or more attributes, a set of resource arrangements for storing the media content on one or more storage resources,
each resource arrangement, of the set of resource arrangements, being associated with at least one of the one or more attributes and including information identifying a plurality of mappings for storing the media content on the one or more storage resources;
select a first resource arrangement, of the set of resource arrangements, based on the one or more values;
store, at a first time, the media content on the one or more storage resources based on the first resource arrangement;
receive a request to access the stored media content;
determine whether to grant the request to access the stored media content,
the one or more devices, when determining whether to grant the request to access the stored media content, being further to:
determine a maximum quantity of concurrent streaming sessions associated with the stored media content; and
grant the request to access the stored media content when a current quantity of concurrent streaming sessions associated with the stored media content is less than the maximum quantity of concurrent streaming sessions; and
provide, at a second time based on determining to grant the request to access the stored media content, the stored media content to one or more other devices, the second time occurring after the first time.

16. The system of claim 15, where the one or more devices are further to:
determine, prior to receiving the request to upload the media content, a plurality of sets of resource arrangements,
where the plurality of sets of resource arrangements include the set of resource arrangements, and
where each set of resource arrangements, of the plurality of sets of resource arrangements, is associated with at least one of a plurality of attributes associated with providing access to the media content,
the plurality of attributes including the one or more attributes.

17. The system of claim 15, where the one or more devices are further to:
determine, based on the set of resource arrangements, a quantity of copies of the media content to be stored on the one or more storage resources; and identify a particular mapping, of the plurality of mappings, for storing each copy of the media content,
where the one or more devices, when storing the media content, are further to:
store each copy of the media content based on the particular mapping identified for storing the copy of the media content.

18. The system of claim 15, where the one or more devices, when selecting the first resource arrangement, are further to:
select a first mapping, of the plurality of mappings, based on the one or more values,
where the first mapping is associated with at least a first resource, of the one or more storage resources;
determine whether at least the first resource is available for storing the media content; and
select a second mapping, of the plurality of mappings, when the at least the first resource is not available,
where the second mapping is not associated with the at least the first resource, and
where the second mapping is different from the first mapping.

19. The system of claim 15, where
the request to upload the media content includes information identifying a name associated with the media content,
the request to access the media content includes information identifying the name, and
the one or more devices are further to:
create an object associated with the name based on receiving the request to upload the media content;
store at least one of:
information associated with the one or more values, or
information associated with the one or more mappings;
associate the object with the at least one of the stored information associated with the one or more values or the stored information associated with the one or more mappings;
identify the object based on the name; and
identify the at least one of the stored information associated with the one or more values or the stored information associated with the one or more mappings based on the object, and
the one or more devices, when determining whether to grant the request to access the media content, are further to:
determine whether to grant the request to access the media content based on the at least one of the stored information associated with the one or more values or the stored information associated with the one or more mappings.

20. The system of claim 19, where the one or more devices, when determining the maximum quantity of concurrent streaming sessions associated with the media content, are further to:
determine the maximum quantity of concurrent streaming sessions associated with the media content based on the at least one of the stored information associated with the one or more values or the stored information associated with the one or more mappings.

* * * * *

UNITED STATES PATENT AND TRADEMARK OFFICE
CERTIFICATE OF CORRECTION

PATENT NO. : 8,886,690 B2  
APPLICATION NO. : 13/308234  
DATED : November 11, 2014  
INVENTOR(S) : David C. Carver et al.

Page 1 of 1

It is certified that error appears in the above-identified patent and that said Letters Patent is hereby corrected as shown below:

In the Claims

Please correct Claim 5 as follows:

column 13, line 47, after "Claim 4," insert -- where --.

column 13, line 55, change -- ; -- to -- , --.

Signed and Sealed this
Fourth Day of August, 2015

Michelle K. Lee
*Director of the United States Patent and Trademark Office*